United States Patent
Cho

(10) Patent No.: US 9,681,355 B2
(45) Date of Patent: *Jun. 13, 2017

(54) METHOD FOR PERFORMING HANDOVER PROCEDURE AND CREATING DATA

(71) Applicant: LG ELECTRONICS INC., Seoul (KR)

(72) Inventor: Yoon Jung Cho, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/075,695

(22) Filed: Mar. 21, 2016

(65) Prior Publication Data

US 2016/0205608 A1 Jul. 14, 2016

Related U.S. Application Data

(63) Continuation of application No. 14/721,962, filed on May 26, 2015, now Pat. No. 9,326,215, which is a (Continued)

(30) Foreign Application Priority Data

Jan. 25, 2008 (KR) .................. 10-2008-0008165

(51) Int. Cl.
*H04W 4/00* (2009.01)
*H04W 36/38* (2009.01)
(Continued)

(52) U.S. Cl.
CPC .......... *H04W 36/38* (2013.01); *H04L 1/1874* (2013.01); *H04W 36/02* (2013.01); *H04W 36/08* (2013.01);
(Continued)

(58) Field of Classification Search
None
See application file for complete search history.

(56) References Cited

U.S. PATENT DOCUMENTS 6,788,652 B1 9/2004 Hwang
2003/0007480 A1 1/2003 Kim et al.
(Continued)

FOREIGN PATENT DOCUMENTS

CN 101080883 A 11/2007
EP 1198107 A2 4/2002
(Continued)

OTHER PUBLICATIONS

"In-Sequence Delivery support for handover", LG Electronics, R2-061363, Shanghai, China, May 8-2, 2006. XP050131299.
(Continued)

*Primary Examiner* — Derrick Ferris
*Assistant Examiner* — Farhad Ali
(74) *Attorney, Agent, or Firm* — Birch, Stewart, Kolasch & Birch, LLP

(57) ABSTRACT

A method is presented for performing handover by a mobile terminal from a source base station to a target base station. The mobile terminal has a Radio Resource Control (RRC) layer and a Radio Link Control (RLC) layer. A handover command is received at the RRC layer of the mobile terminal. An indication associated with the handover command is received at the RLC layer of the mobile terminal. At least one RLC service data unit (SDU) from at least one protocol data unit (PDU) having a sequence number that is less than a higher edge of a window of the mobile terminal is reassembled at the RLC layer of the mobile terminal. The reassembled at least one RLC SDU to an upper layer of the mobile terminal is delivered at the RLC layer of the mobile terminal.

10 Claims, 16 Drawing Sheets

Related U.S. Application Data continuation of application No. 12/323,902, filed on Nov. 26, 2008, now Pat. No. 9,072,015.

(51) Int. Cl.
*H04W 76/04* (2009.01)
*H04L 1/18* (2006.01)
*H04W 36/02* (2009.01)
*H04W 36/08* (2009.01)
*H04L 1/00* (2006.01)
*H04W 28/04* (2009.01)
*H04W 80/02* (2009.01)

(52) U.S. Cl.
CPC ... *H04W 76/046* (2013.01); *H04L 2001/0092* (2013.01); *H04W 28/04* (2013.01); *H04W 80/02* (2013.01)

(56) References Cited

U.S. PATENT DOCUMENTS

| | | |
|---|---|---|
| 2006/0240832 A1 | 10/2006 | Kim et al. |
| 2007/0047500 A1 | 3/2007 | Usuda et al. |
| 2007/0291695 A1* | 12/2007 | Sammour ............. H04W 36/02 370/331 |
| 2008/0098283 A1 | 4/2008 | Vayanos et al. |
| 2008/0188224 A1 | 8/2008 | Pani et al. |
| 2009/0135747 A1 | 5/2009 | Hwang |

FOREIGN PATENT DOCUMENTS

| | | |
|---|---|---|
| EP | 1915017 A2 | 4/2008 |
| JP | 2007-60162 A | 3/2007 |
| KR | 10-0382470 B1 | 5/2003 |
| WO | 2007/077523 A1 | 7/2007 |

OTHER PUBLICATIONS

"Universal Mobile Telecommunications System (UMTS); Radio Link Control (RLC) protocol specification (3GPP TS 25.322 version 7.2.0 Release 7)", ETSI TS 125 322-ETSI Standards, vol. 3-R2, No. V7.2.0, 2006. XP014035578.
Ericsson, "PDCP re-ordering at handover", 3GPP TSG-RAN WG2 #59, Tdoc R2-073224, Aug. 20-24, 2007, 6 pages.
Ericsson, "PDCP reordering function at handover", 3GPP TSG-RAN WG2 #60, Tdoc R2-074945 (update of R2-074070), Nov. 5-9, 2007, 5 pages.
Ericsson, "Reordering at handover", 3GPP TSG-RAN WG2 #59 bis, Tdoc R2-074070 (update of R2-073224), Oct. 8-12, 2007, 6 pages.
Lg Electronics, "SDU Handling During Inter eNB Handover", 3GPP TSG-RAN WG2 #56, R2-063247, Nov. 6-10, 2006, 8 pages.
Office Action for Chinese Application No. 200880124354.X dated Aug. 24, 2012.
3GPP TS 25.301 V3.6.0, "3rd Generation Partnership Project; Technical Specification Group Radio Access Network; Radio Interface Protocol Architecture (Release 1999)," Sep. 2000.

* cited by examiner ns

METHOD FOR PERFORMING HANDOVER PROCEDURE AND CREATING DATA

CROSS REFERENCE TO RELATED APPLICATIONS

This Application is a Continuation of U.S. patent application Ser. No. 14/721,962 filed on May 26, 2015 (now U.S. Pat. No. 9,326,215 issued on Apr. 26, 2016), which is a Continuation of U.S. patent application Ser No. 12/323,902 filed on Nov. 26, 2008 (now U.S. Pat. No. 9,072,015 issued on Jun. 30, 2015), which claims the benefit under 35 U.S.C. §119(a) to Korean Patent Application No. 10-2008-0008165 filed on Jan. 25, 2008, all of which are hereby expressly incorporated by reference into the present application.

BACKGROUND OF THE INVENTION

The present invention relates to wireless communications and, more particularly, to a method for performing a handover procedure and creating data.

A cellular scheme is a concept proposed to overcome the limitation of service area, and frequency and subscriber accommodation capacity. It provides a speech area (call area, or a communication range) by changing a single base station of a high output into a plurality of base stations of a low output. Namely, a mobile communication service area is divided into a plurality of small cells, and different frequencies are allocated to neighbor cells while the same frequency band is allocated to cells which are so away from each other that no interference is generated therebetween to thus spatially re-use frequencies.

Handover (or handoff) refers to a function according to which when a user equipment (UE) moves and is released from a current communication service base station (referred to as 'serving cell', hereinafter) and enters a neighbor cell of an adjacent communication service area, the UE is automatically tuned with a new traffic channel of the adjacent communication service area and maintains its call state. That is, when the UE is communicating with a particular base station and if a signal strength of the particular base station (referred to as 'source base station, hereinafter) weakens, the UE is linked to a neighbor base station (referred to as 'target base station, hereinafter). When handover is supported, a call interruption, that may be otherwise generated when the UE moves to a neighbor cell, can be resolved.

Handover may be defined as three separated steps, a handover preparation, a handover execution, and a handover completion.

The UE measures a signal transmitted from the serving cell, and if a channel quality is drops to below a certain threshold value, the UE transmits corresponding information to the source base station through a measurement report. Then, the source base station determines handover according to the measurement report. Upon determining handover, the source base station a handover request to the target base station and then receives a handover request ACK from the target base station. The source base station informs the UE about a start of handover by sending a handover command. The processes up till now belong to the handover preparation.

After the handover preparation, the UE moves to the target base station through the handover execution and the handover completion processes. At this time, the source base station stops downlink data transmission of a PDCP (Packet Data Convergence Protocol) layer and forwards downlink data to the target base station.

In this respect, however, an RLC layer and a PDCP layer of the UE in the downlink transmission and an RLC layer and a PDCP layer of the base station in the uplink transmission do not know the handover execution and completion processes. Accordingly, the RLC layers cannot help but transfer SDUs (Service Data Units) in sequence regardless of handover. This is the same even when the RLC layers cannot transfer the SDUs to the PDCP layers due to a blank of PDUs corresponding to some sequence numbers. The PDCP layers also cannot forward nor reorder downlink or uplink data.

Due to such a restriction, if handover is completed with a blank of a PDU, other PDUs following the blank PDU are all removed. The downlink data removed at the RLC layer of the UE can be restored as the PDCP layer of the UE requests re-transmission of the downlink data from the PDCP layer of the target base station after handover is completed. And the data removed at the RLC layer of the base station can be restored as the PDCP layer of the target base station requests re-transmission of the data after the handover is completed.

However, because such restoration requests restoration between the PDCP layer of the UE and that of the target base station, namely, requests the re-transmission in the wireless communication, radio resources are wasted, and because the restoration time is delayed, the transmission efficiency is degraded.

Thus, in order to solve the problem, a handover executing method and data creating method allowing data transmission/reception between the RLC layer and the PDCP layer while the handover is being performed is requested.

SUMMARY OF THE INVENTION

The present invention provides a method for performing handover procedure and creating data. According to an embodiment of the invention, a method and device for performing handover by a UE from a source base station to a target base station is provided. The method includes receiving at least one data block from the source base station, receiving a handover command from the source base station, assembling the at least one data block out of sequence regardless of the reception order to create a reassembled data block, and transmitting a handover confirmation to the target base station.

According to another embodiment of the invention, a method and device for performing handover by a source base station to a target base station over a UE is provided. The method includes transmitting a handover command to the UE, assembling at least one data block transmitted from the UE out of sequence regardless of the reception order to create a reassembled data block, and forwarding the reassembled data block to the target base station.

According to still another embodiment of the invention, a method and device for creating a data block by an RLC layer is provided. The method includes receiving at least one PDU, receiving a message indicating reassembling the at least one PDU out of sequence regardless of the reception order, and reassembling the at least one PDU out of sequence to create an SDU.

In the present invention, a lower layer is informed about a handover time point, so that the lower layer can generate data blocks out of sequence and transmits them to an upper layer, to thereby guarantee a transfer of data without a loss although handover is performed. Because data is transmitted without a loss, overhead due to re-transmission data and overhead due to an additional control signal can be reduced, and a processing gain can be obtained.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
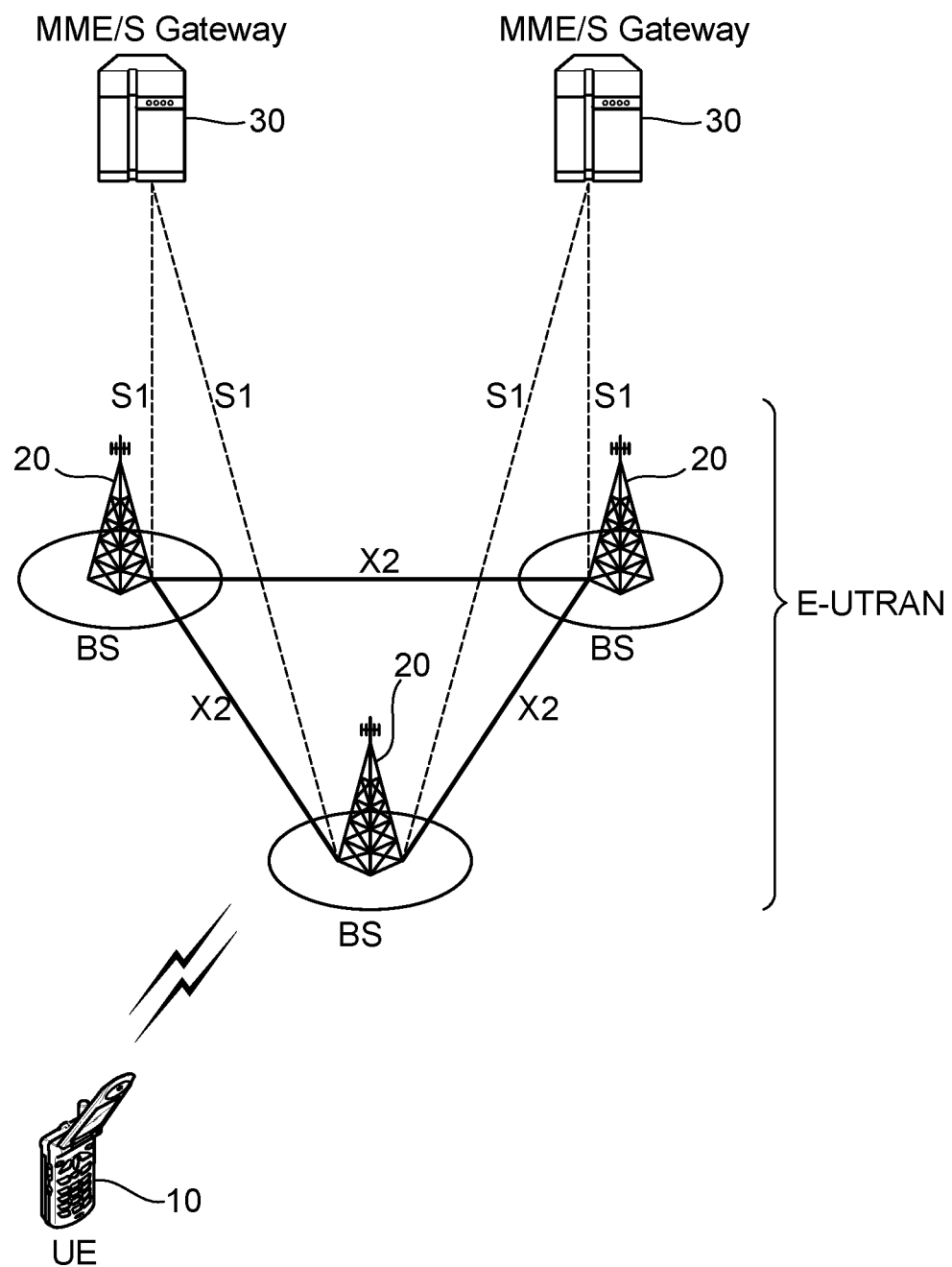
FIG. 1 is a schematic block diagram showing a conventional wireless communication system.

FIG. 1 is a schematic block diagram showing a wireless communication system. It may be a network structure of an E-UMTS (Evolved-Universal Mobile Telecommunications System). The E-UMTS system may be an LTE (Long Term Evolution) system. The wireless communication system can be widely deployed to provide a variety of communication services, such as voices, packet data, etc.

Referring to FIG. 1, an E-UTRAN (Evolved-UMTS Terrestrial Radio Access Network) includes a base station (BS) 20. user equipment (UE) 10 may be fixed or have mobility, and may be referred to as another terminology, such as a mobile station (MS), a user terminal (UT), a subscriber station (SS), a wireless device, etc. The BS 20 generally refers to a fixed station that communicates with the UE 10 and may be called another terminology, such as an NB (Node-B), an eNB (evolved-Node B), a BTS (Base Transceiver System), an access point, etc. There are one or more cells within the coverage of the BS 20. An interface may be used for user traffic or control traffic between BSs 20. Hereinbelow, "downlink" refers to communication from the BS 20 to the UE 10, and "uplink" refers to communication from the UE 10 to the BS 20.

The BS 20 provides end points of a user plane and a control plane to the UE 10. The BSs 20 may be connected via an X2 interface, and a meshed network structure in which the X2 interface always exists may be provided between neighbor BSs 20.

Figure 2:
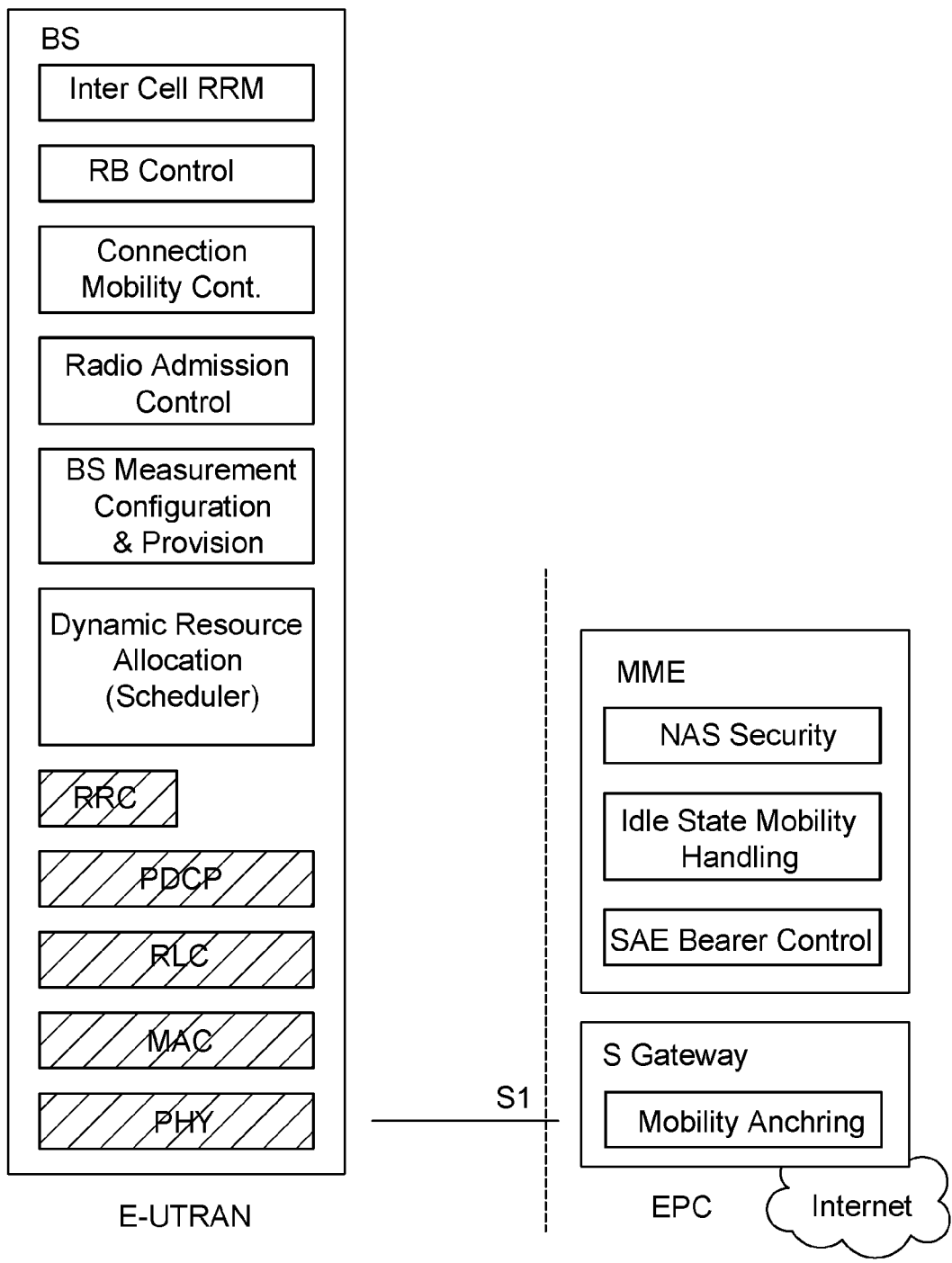
FIG. 2 is a schematic block diagram showing a conventional functional split between an E-UTRAN and an EPC.

FIG. 2 is a schematic block diagram showing a functional split between an E-UTRAN and an EPC.

With reference to FIG. 2, shaded blocks (with oblique lines) represent radio protocol layers, and empty blocks represent functional entities of the control plane.

The BS performs the following functions: (1) radio resource management (RRM) function such as radio bearer (RB) control, radio admission control, connection mobility control, dynamic resource allocation to the UE; (2) IP (Internet Protocol) header compression and decryption of user data stream; (3) routing of user plane data to a serving gateway (S-GW); (4) scheduling and transmission of a paging message; (5) scheduling and transmission of broadcast information; and (6) measurement for mobility and scheduling and establishing a measurement report.

An MME performs the following functions: (1) distribution of paging messages to BSs; (2) security control; (3) idle state mobility control; (4) S bearer control; (5) ciphering and integrity protection of NAS (Non-Access Stratum) signaling.

The S-GW performs the following functions: (1) termination of a user plane packet with respect to paging; and (2) user plane switching to support UE mobility.

Meanwhile, layers of a radio interface protocol between the UE and the base station include a physical layer, a MAC (Medium Access Control) layer, an RLC (Radio Link Control) layer, a PDCP (Packet Data Convergence Protocol) layer, an RRC (Radio Resource Control) layer.

The layers of the radio interface protocol may be divided into a first layer L1, a second layer L2, and a third layer L3 based on the three lower layers of an open system interconnection (OSI) standard model widely known in communication systems. Compared with the OSI model, the physical layer corresponds to the first layer L1, the upper MAC layer and the RLC layer correspond to the second layer L2, and the RRC layer corresponds to the third layer L3. The physical layer belonging to the first layer provides an information transfer service using a physical channel, and the radio RRC layer positioned at the third layer L3 serves to control radio resources between the UE and the network.

The layer structure of the radio interface protocol may be applied in the same manner to the UE and the E-UTRAN. In the UE, all the protocols may belong to a single entity, while in the E-UTRAN, the protocols may be distributed by respective network configuration elements.

Data transmitted by such entire protocol structure may be divided into two regions of a user plane and a control plane according to a type of the data. The user plane is a region where traffic information of a user such as voice or IP packets are transmitted, and the control plane is a region where control information such as a network interface, maintaining or management of a call, or the like. Data transferred by the RRC layer is included in the control plane. The RLC layer may belong to the user plane or the control plane according to a type of a connected upper layer.

Namely, if the RLC layer is connected with the RRC layer, it may belong to the control plane, and in other cases, the RLC layer may belong to the user plane.

Figure 3:
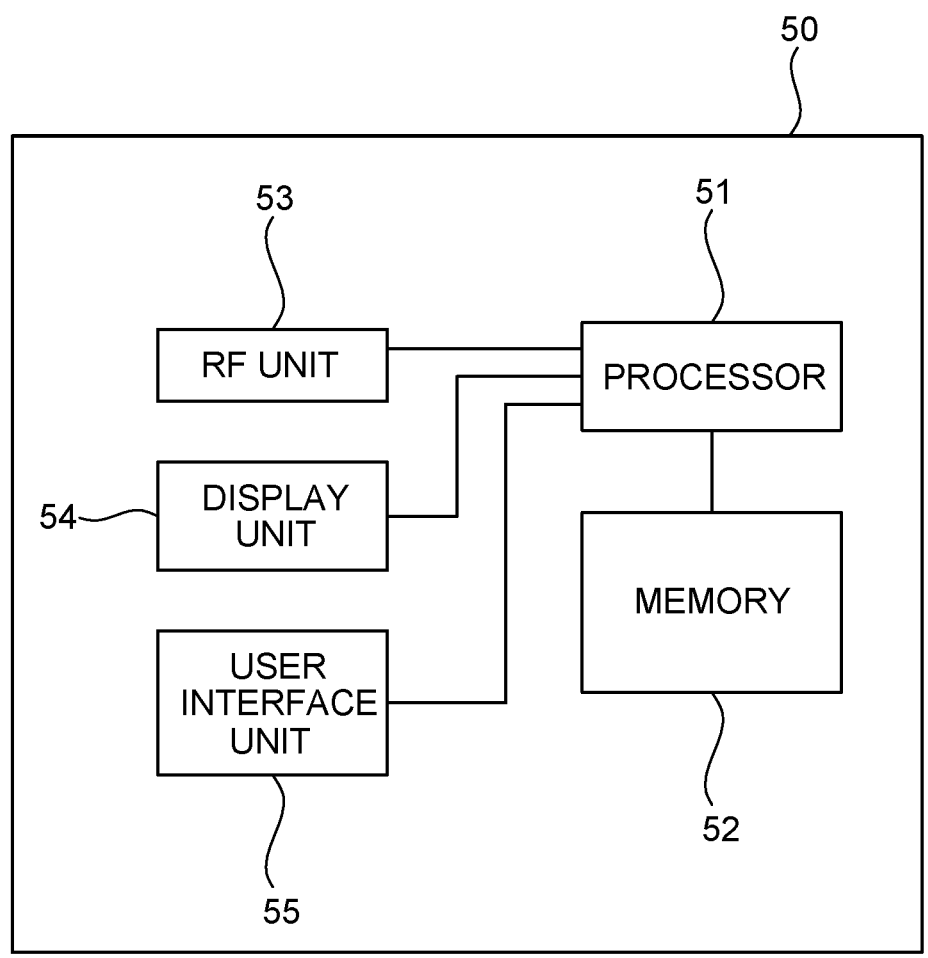
FIG. 3 is a schematic block diagram showing elements of a conventional UE.

FIG. 3 is a schematic block diagram showing elements of a UE. The UE 50 includes a processor 51, a memory 52, an RF unit 53, a display unit 54, and a user interface unit 55. The processor 51 includes the layers of the radio interface protocol and provides the control plane and the user plane. Functions of the layers may be implemented via the processor 51. The memory 52 is connected with the processor 51 and stores a UE driving system, an application and a general file. The display unit 54 displays various information of the UE and may be formed by using the well know elements such as an LCD (Liquid Crystal Display), an OLED (Organic Light Emitting Diode), or the like. The user interface unit 55 may be configured by combining well known user interfaces such as a keypad or a touch screen. The RF unit 53 is connected with the processor and transmits and/or receives a radio signal.

Figure 4:
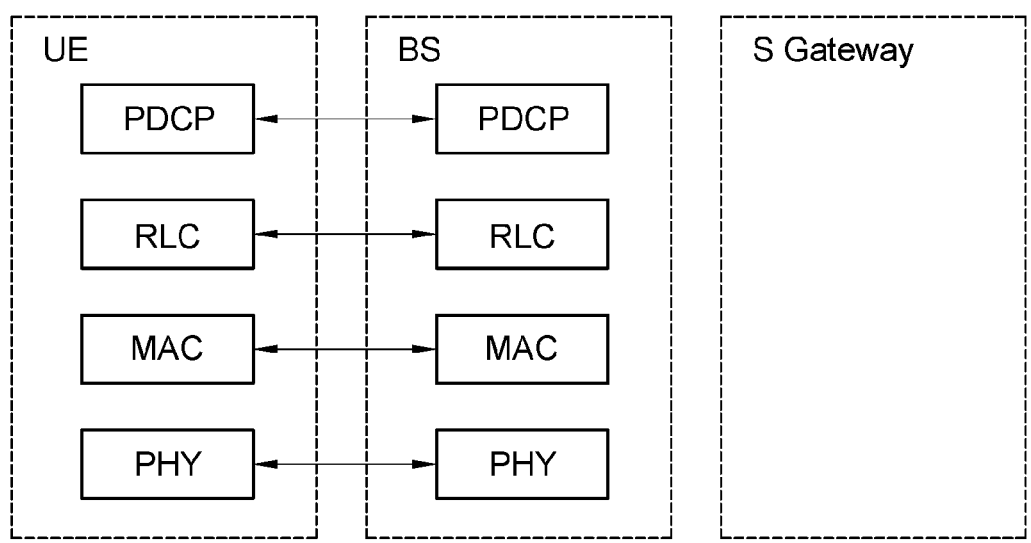
FIG. 4 is a schematic block diagram showing a user plane of a conventional radio interface protocol.
Figure 5:
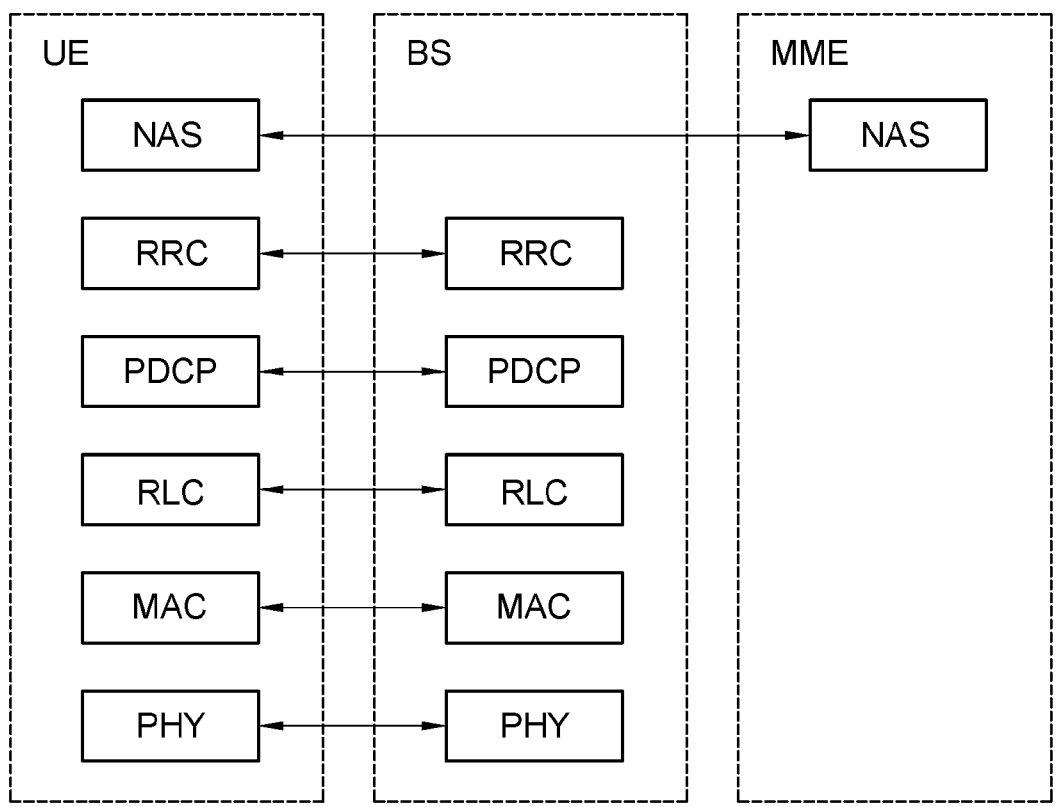
FIG. 5 is a schematic block diagram showing a control plane of the conventional radio interface protocol.

FIG. 4 is a schematic block diagram showing the user plane of the radio interface protocol. FIG. 5 is a schematic block diagram showing the control plane of the radio interface protocol. It shows the structure of the radio interface protocol between the UE and the E-UTRAN. The user plane is a protocol stack for transmitting user data, and the control plane is a protocol stack for transmitting a control signal.

With reference to FIGS. 4 and 5, the physical layer, as a first layer, provides an information transfer service to an upper layer by using a physical channel. The physical layer is connected to an upper layer called a medium access control (MAC) layer via a transport channel, and data is transferred between the MAC layer and the physical layer via the transport channel. Meanwhile, between different physical layers, namely, between a physical layer of a transmitting side and that of a receiving side, data is transferred via the physical channel.

Techniques such as data multiplexing, channel coding, spreading, modulation, or the like, are applied for the physical layer. In the wireless environment, radio signals change frequently according to the movement of the UE or a surrounding environment, so various methods for correcting them are required.

A radio data link layer corresponding to the second layer includes a MAC layer, an RLC layer, and a PDCP layer. The MAC layer of the second layer, which handles mapping between a logical channel and a transport channel, selects a proper transport channel to transmit data received from the RLC layer, and adds required control information to a header of a MAC PDU (Protocol Data Unit). A mapping relationship between the logical channel and the transparent channel will be described hereafter.

The RLC layer of the second layer is positioned at an upper position of the MAC layer and supports reliable data transmissions. The RLC layer segments and concatenates RLC SDUs (Service Data Units) delivered from an upper layer in order to configure data with a size suitable for a radio interface. The RLC layer of a receiver supports a reassembling function of data to restore the original RLC SDUs from received RLC PDUs.

Each RLC entity may operate in a transparent mode (TM), an unacknowledged mode (UM), and an acknowledged mode (AM) according to a processing and transmission method of the RLC SDUs. CRC error detection is performed at the physical layer in all the RLC modes. The results of the CRC checking are delivered together with actual data to the RLC layer.

In the transparent mode (TM), the RLC layer delivers an RLC PDU, without adding a protocol header thereto, to the MAC layer via the transport channel. If an RLC PDU has a transmission error, it may be removed or have an indication that it has an error. The TM may be used when upper layer data is a streaming type data. In this case, the upper layer data is not segmented, and in a particular case, a segmentation/reassembling function is used limitedly.

In the unacknowledged mode (UM), a re-transmission protocol is not used, so data transfer is not guaranteed. A transmitter deletes data based on a timer without definite signaling, so RLC PDUs, which have not been transmitted within a particular time, are removed from a transmission buffer. The PDUs include sequence numbers (SN), so integrity of the PDUs of an upper layer can be observed. The UM RLC entity is defined uni-directionally because relationship between uplink and downlink is not required. For example, a user service to which the UM RLC entity can be applicable includes a cell broadcast service and a VoIP (Voice over Internet Protocol).

The acknowledged mode (AM) uses an ARQ process to correct an error. If the RLC PDU is not properly transferred (e.g., as it exceeds the maximum number of re-transmissions or as a transmission time lapses), the RLC layer reports the upper layer accordingly and removes the RLC PDU from the buffer. An AM RLC entity, having a re-transmission function, provides a bi-directional service.

For the re-transmission function of the AM, various parameters such as a transmission window (Tx window), a reception window (Rx window), a timer, a counter, a status PDU (or a status report), a polling bit, or the like, are used. The transmission window is the number of RLC PDUs that can be transmitted with the maximum number, in a state that a status PDU is not received from the receiver.

The PDCP layer of the second layer is used only at a packet switching region, and may compress a header of an IP packet and transmit the same in order to enhance a transmission efficiency of packet data in a radio channel.

The RRC layer of the third layer is defined only at the control plane. The RRC layer serves to control a lower layer and exchanges radio resource control information between the UE and the network. Various RRC states are defined according to a communication state of the UE, and a transition between RRC states is possible as necessary. In the RRC layer, various procedures related to radio resource management such as a system information broadcast, an RRC connection management procedure, a radio resource control procedure, a security procedure, a measurement procedure, a mobility management procedure (handover), or the like, are defined.

A point of time at which handover is reported to a lower layer and its method will now be described. Here, the lower layer refers to a layer which is lower to the RRC layer, and the lower layer may refer to the RLC layer or the PDCP layer.

Figure 6:
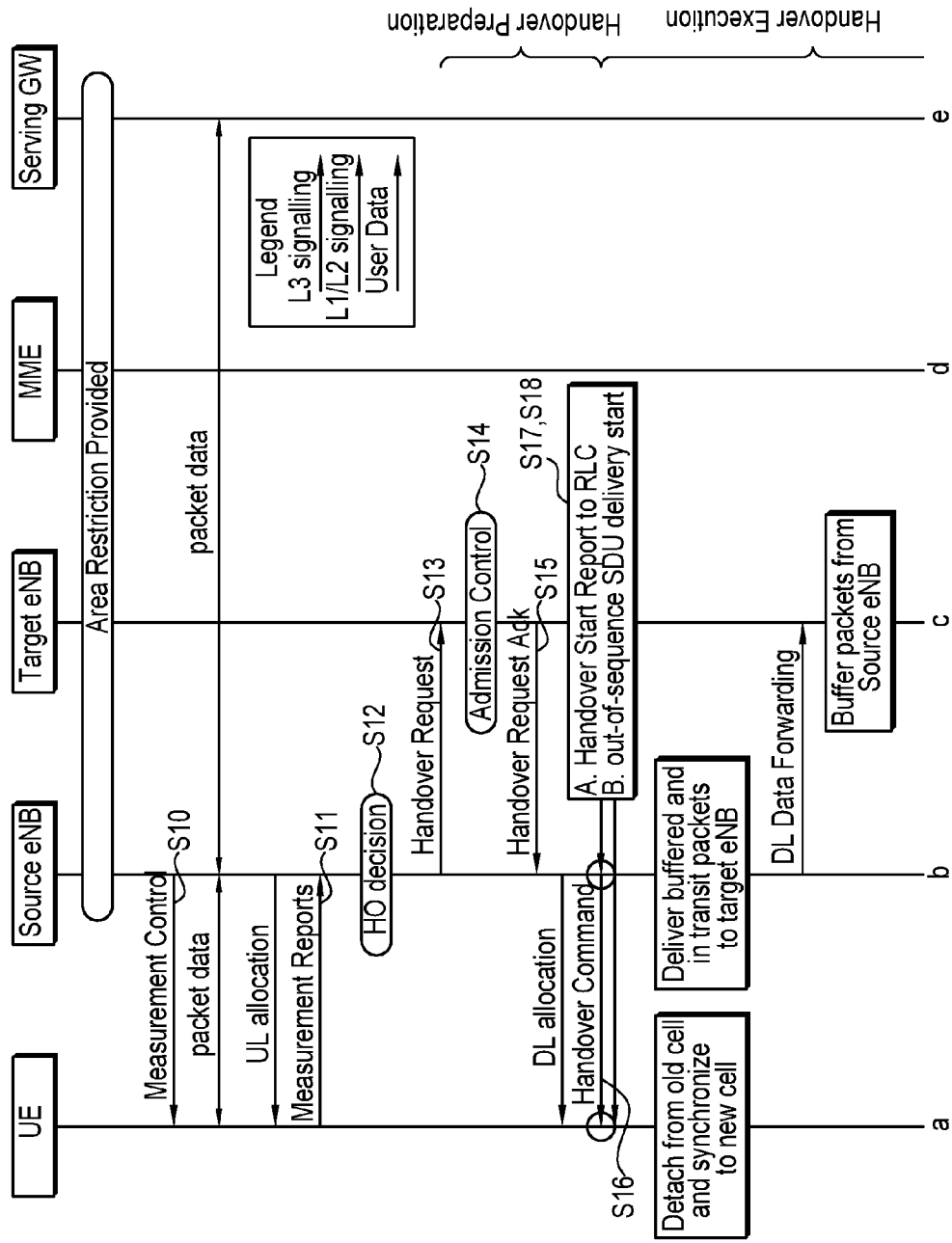
FIGS. 6 and 7 are flow charts illustrating a point of time for reporting a start of handover execution to an RLC layer according to an embodiment of the present invention.
Figure 7:
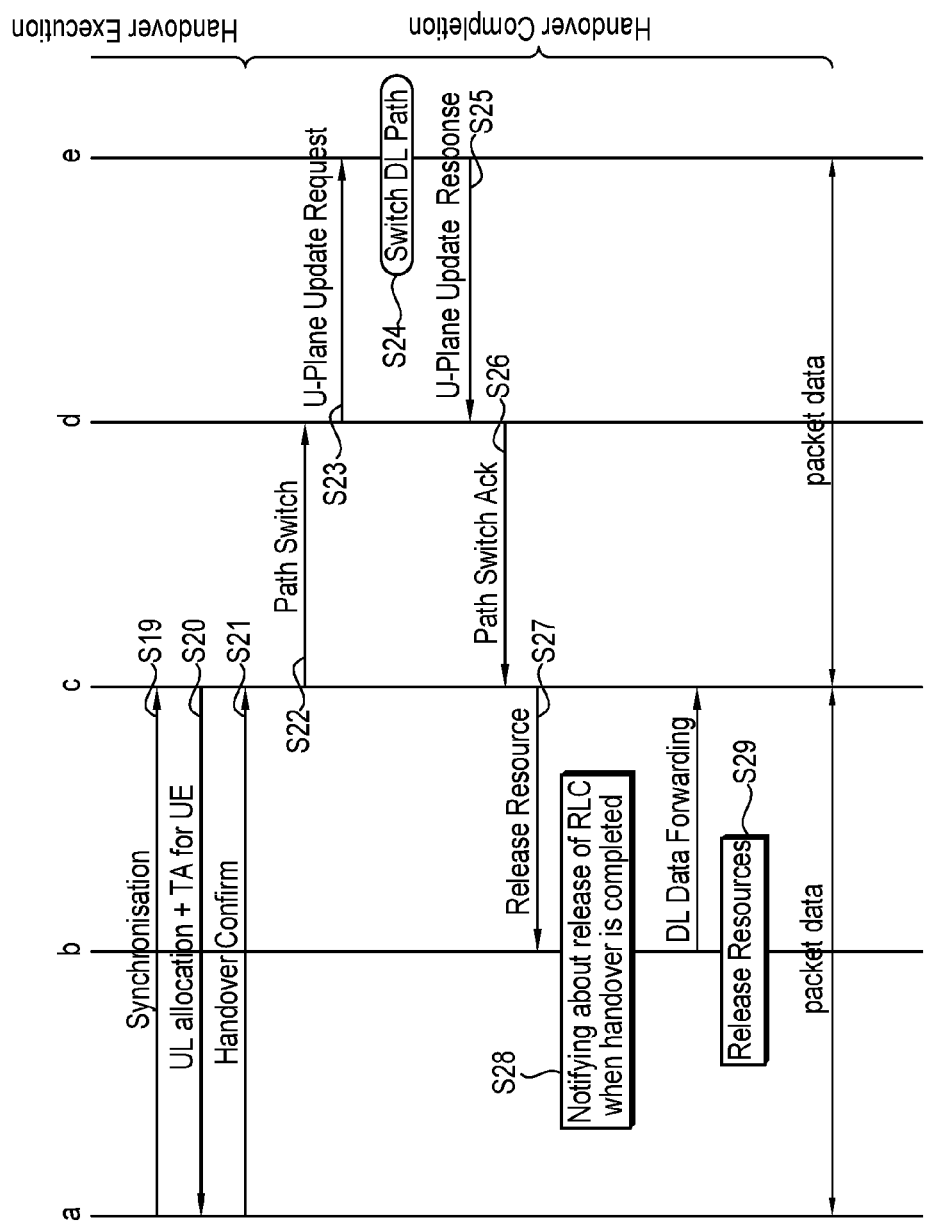

FIGS. 6 and 7 are flow charts illustrating a point of time for reporting a start of handover execution to the RLC layer according to an embodiment of the present invention. In FIGS. 6 and 7, the points 'a' to 'e' are connected, respectively.

With reference to FIGS. 6 and 7, a source base station (source eNB) transmits a measurement control to the UE (S10). The UE transmits a measurement report to the source base station (S11). The source eNB determines whether to perform handover (S12). When the source eNB determines handover, it transmits a handover request to a target base station (target eNB) (S13). The target eNB performs an admission control with respect to the handover request (S14).

When the target eNB admits the handover request, it transmits a handover request ACK to the source eNB (S15). The source eNB transmits a handover command to the UE (S16). The processes up till now belong to handover preparation.

At the point of time of handover execution, the following step, is reported to the RLC layer of the UE and to the RLC layer of the source eNB (S17). When the handover command is transmitted from the source eNB to the UE, the RRC layer of the source eNB reports the handover to the lower RLC layer and PDCP layer. Also, the RRC layer of the UE reports the handover to the lower RLC layer and PDCP layer. Upon receiving the report on the handover, the source eNB and the UE starts out-of-sequence SDU delivery from the RLC layer to the PDCP layer in the respective devices (S18). Here, the out-of-sequence SDUs refer to at least one data block included in a reception window (or OSD_Window, to be described) among data blocks stored in a reception buffer. The out-of-sequence SDUs are generated by being reassembled regardless of the order in which they are stored in the reception buffer. In this sense, the out-of-sequence SDUs are discriminated from in-sequence SDUs, and a data loss can be reduced during the handover through the out-of-sequence SDU delivery.

Also at the point of time of handover execution, the UE is detached from an old cell of the source eNB and attempts synchronization with a new cell of the target eNB, and the source eNB transfers data packets stored in the buffer to the target eNB (S18).

Next, the UE matches synchronization to the target eNB (S19). The target eNB allocates uplink resources to the UE and performs time alignment (TA) (S20). The UE transmits a handover confirmation to the target eNB (S21). As the handover configuration is transmitted, the handover execution is terminated, and the handover completion follows.

Upon receiving the handover confirmation, the target eNB transmits a path switch to an MME. The MME transmits a U-plane update request to a serving GW (S23). The serving GW switches a downlink path (S24) and transmits a U-plane update response to the MME (S25).

The MME transmits a path switch ACK to the target eNB (S26). The target eNB transmits a resource release to the source eNB (S27). Upon receiving the resource release, the RRC layer of the source eNB reports the handover completion to the lower RLC layer and PDCP layer (S28). Then, the RLC layer of the source eNB flushes a downlink data buffer and delivers in-transit DL data packets to the target eNB. The source eNB releases resources (S29), and at this time, the handover procedure is terminated.

In the conventional art, the RLC layer may deliver SDUs in sequence to an upper layer. However, if the in-sequence SDU delivery is performed at the point of time when handover execution starts in accordance with the conventional art, a data loss may occur. Thus, in the present invention, the RRC layer informs the RLC layer and the PDCP layer about the point of time of the handover, so that the RLC layer can perform the out-of-sequence SDU delivery during handover in a manner to thereby minimize a data loss. Thus, during the handover, PDCP layer may buffer non-transmitted data or reorder received data.

Figure 8:
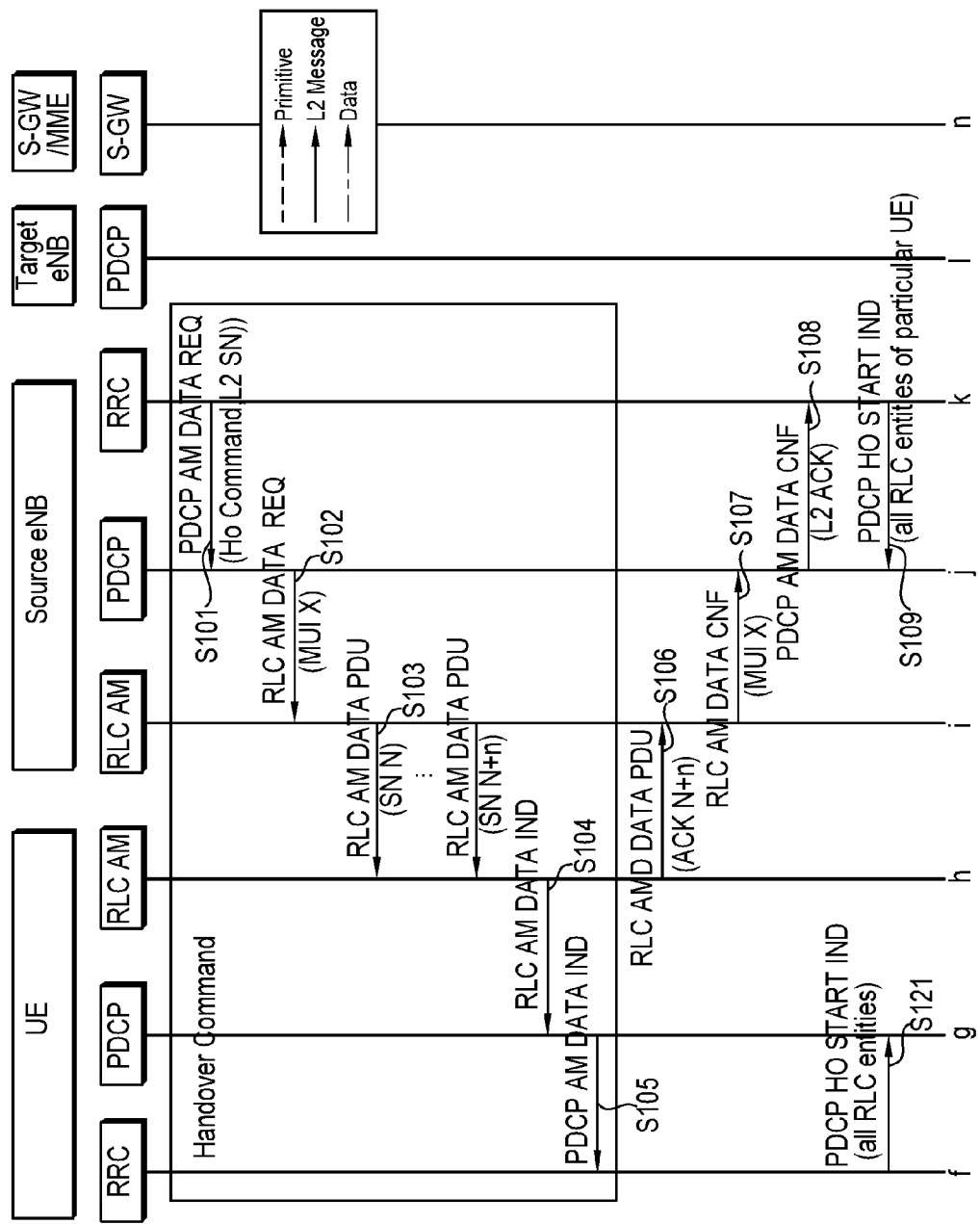
FIGS. 8 and 9 are flow charts illustrating the process of a method for reporting handover to the RLC layer and a PDCP layer according to an embodiment of the present invention.
Figure 9:
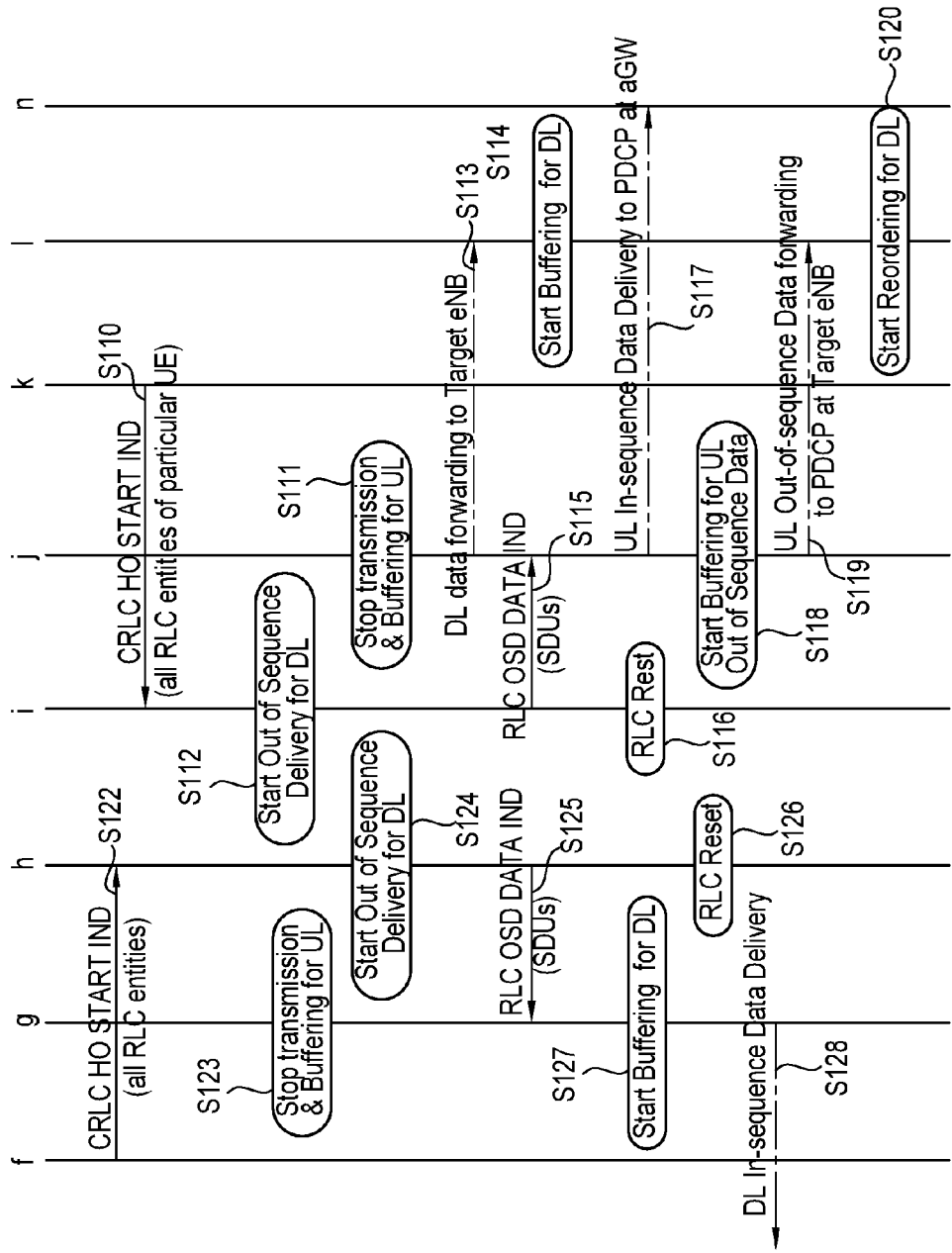

FIGS. 8 and 9 are flow charts illustrating the process of a method for reporting handover to the RLC layer and the PDCP layer according to an embodiment of the present invention. In FIGS. 8 and 9, the points 'f' to 'n' are connected, respectively.

With reference to FIGS. 8 and 9, the method for reporting handover to the RLC layer and the PDCP layer may be divided into a method for transmitting a handover command from the source eNB to the UE, a method for informing the second layer L2 of the source eNB about the handover execution, and a method for informing the second layer L2 of the UE about the handover execution. Hereinbelow, the respective processes will be discriminately described.

The following paragraphs describe the method for transmitting the handover command. The handover command is made through RRC signaling from the RRC layer of the source eNB to that of the UE, so the RRC layer of the source eNB transmits the handover command by delivering a primitive PDCP AM data request, an L2 message, to the PDCP layer (S101). The PDCP layer of the source eNB delivers a primitive RLC AM data request to the RLC layer (S102).

The RLC layer of the source eNB performs a segmentation/concatenation process to create RLC AMD data PDUs and transmits them to the RLC layer of the UE (S103). The RLC layer of the UE delivers a primitive RLC AM data indicator (RLC AM data IND) to the PDCP layer of the UE (S104), and the PDCP layer of the UE delivers a PDCP AM data indicator (PDCP AM data IND) to the RRC layer of the UE (S105). In this manner, the handover command is transmitted to the RRC layer of the UE.

The RLC layer of the source eNB receives an ACK as an RLC AMD control PDU from the RLC layer of the UE (S106). The RLC layer of the source eNB cannot know whether content of data transmitted to the UE is the handover command. Thus, the RLC layer of the source eNB delivers a primitive RLC AM data CNF to the PDCP layer by using a message unit ID (MUI) between the PDCP layer and the RLC layer and informs about the transmission confirmation for the MUI (S107).

The PDCP layer of the source eNB delivers L2 ACK, a reception confirmation response of the L2 message, to the RRC layer of the source eNB (S108). The RRC layer of the source eNB can recognize that the UE received the handover command and will enter the handover execution procedure. The RRC layer of the source eNB may inform the L2 layer about the start of the handover execution by receiving L2 ACK.

The following paragraphs describe the method for informing the second layer of the source eNB about the handover execution.

The RRC layer of the source eNB delivers a primitive PDCP handover start indicator (ND) to the PDCP layer of the source eNB (S109). And the RRC layer of the source eNB transmits a primitive CRLC handover start indicator (Primitive CRLC_HO_Start_IND) to every RLC UM entity and RLC AM entity of the UE (S110). Upon receiving the primitive PDCP handover start indicator, the PDCP layer of the source eNB stops transmission of downlink data with respect to every resource block (RB) of the UE and buffers the downlink data until when the handover is completed (S111).

Meanwhile, upon receiving the primitive CRLC handover start indicator, the RLC layer of the UE performs out-of-sequence SDU delivery for uplink data (S112). Separately, the PDCP layer of the source eNB transmits the buffered downlink data to the PDCP layer of the target eNB (S113). The target eNB starts buffering the received downlink data (S114).

The RLC layer of the source eNB stops receiving of the data, reassembles PDUs stored in the reception buffer (Rx buffer) into SDUs, and delivers the SDUs, to the PDCP layer of the source eNB via a primitive RLC_OSD_DATA_IND (S115). SDU segments, which have failed to be reassembled into the SDUs, are deleted from the reception buffer, and the timer, a state variable, or the like, are reset (S116). In this manner, when the handover fails, the RLC layer can transmit/receive data.

The PDCP layer of the source eNB transfers the uplink data blocks received in sequence to the S-GW (S117), and buffers the uplink data blocks received out of sequence (S118). The PDCP layer of the source eNB forwards the buffered out-of-sequence uplink data blocks to the PDCP layer of the target eNB (S119). The PDCP layer of the target eNB reorders the in-sequence uplink data blocks and the out-of-sequence uplink data blocks (S120).

The following paragraphs describe the method within the UE for informing the second layer of the UE about the handover execution.

When the RRC layer of the UE receives a handover command, it delivers a primitive PDCP_HO_START_IND to the PDCP layer of the UE (S121). The RRC layer of the UE transmits a primitive CRLC_HO_START_IND to every RLC UM entity and RLC AM entity (S122). The PDCP layer of the UE stops transmission of uplink data with respect to every resource block and buffers the uplink data blocks until when the handover is completed (S123). Meanwhile, the RLC layer of the UE performs out-of-sequence SDU delivery on downlink data (S124).

Upon receiving the primitive CRLC_HO_START_IND from the PDCP layer of the UE, the RLC layer of the UE stops receiving downlink data and reassembles at least one PDU, included in a reception window (or OSD_Window) among PDUs stored in the reception buffer, into SDUs. And the RLC layer of the UE transfers the reassembled SDUs to the PDCP layer of the UE via a primitive RLC_OSD_DATA_IND (S125). In this case, SDU segments, which have failed to be reassembled into the SDUs, are deleted from the reception buffer, and the timer, a state variable, or the like, are reset (S126). Through resetting, only data is deleted from the reception buffer while the RLC entity remains, and meanwhile, the RLC entity can be deleted through releasing.

The PDCP layer of the UE reorders the out-of-sequence downlink data until when the handover is completed (S127), and delivers the in-sequence downlink data to an upper layer (S128).

Thus, because the time point of the handover execution is informed to the RLC layer of the UE and to the RLC layer of the source eNB, the RLC layers of the UE and the source eNB can deliver their respective uplink and downlink SDUs, which are assembled out of sequence, to the PDCP layers of the UE and the source eNB, and thus, a data loss during handover can be reduced. In addition, the source eNB can not only inform the target eNB about the time and method of downlink data forwarding but also reorder and transfer the previously received uplink data to the S-GW to be forwarded to the target eNB.

As mentioned above, the handover procedure is divided into a handover preparation phase, a handover execution phase, and a handover completion phase, of which the handover preparation and the handover execution have been explained. The following paragraphs describe the method for reporting the handover completion to the RLC layer and the PDCP layer.

Figure 10:
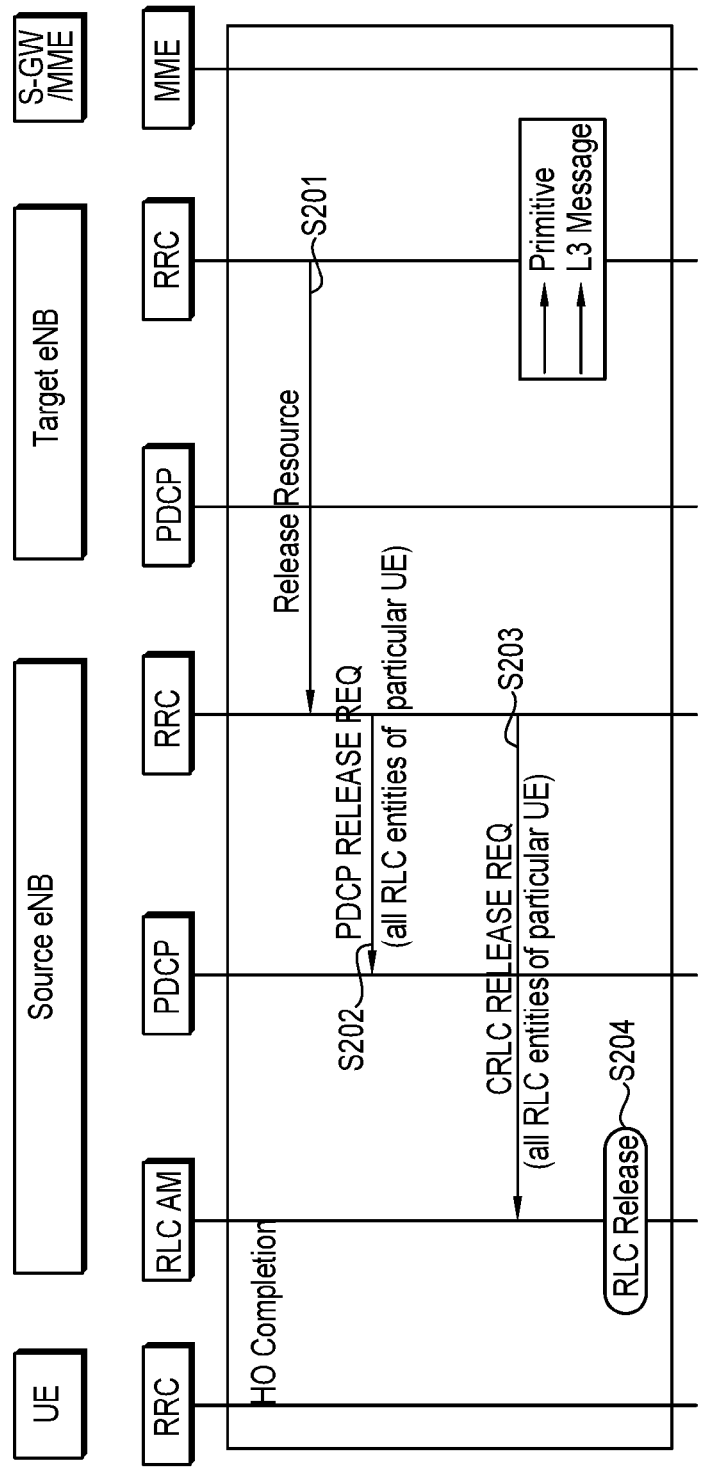
FIG. 10 is a flow chart illustrating the process of a method for reporting handover completion according to an embodiment of the present invention.

FIG. 10 is a flow chart illustrating the process of the method for reporting the handover completion according to an embodiment of the present invention. The handover completion is reported to the second layer L2 of the source eNB.

With reference to FIG. 10, the RRC layer of the target eNB transmits resource release to the RRC layer of the source eNB (S201). The RRC layer of the source eNB can recognize that the handover has been successfully performed through the handover completion. As the handover is successfully completed, the second layer of the source eNB is not necessary any longer, so it is released. In this regard, if the RLC layer is released when the handover starts, and in this state, if the handover fails, a new configuration process of the RLC layer would be required, so the releasing of the RLC layer at the time of starting handover is not desirous. Consequently, the RRC layer of the target eNB transmits the resource release so that the second layer L2 of the source eNB can be released when the handover is completed.

Upon receiving the resource release, the RRC layer of the source eNB delivers a primitive PDCP release request to the PDCP layer of the source eNB to release every PDCP layer with respect to the UE (S202). Also, the RRC layer of the source eNB delivers a primitive CRLC_Release_Request to the RLC layer of the source eNB to release every RLC entity of the UE (S203). The RLC layer of the UE releases every RLC entity (S204).

Figure 11:
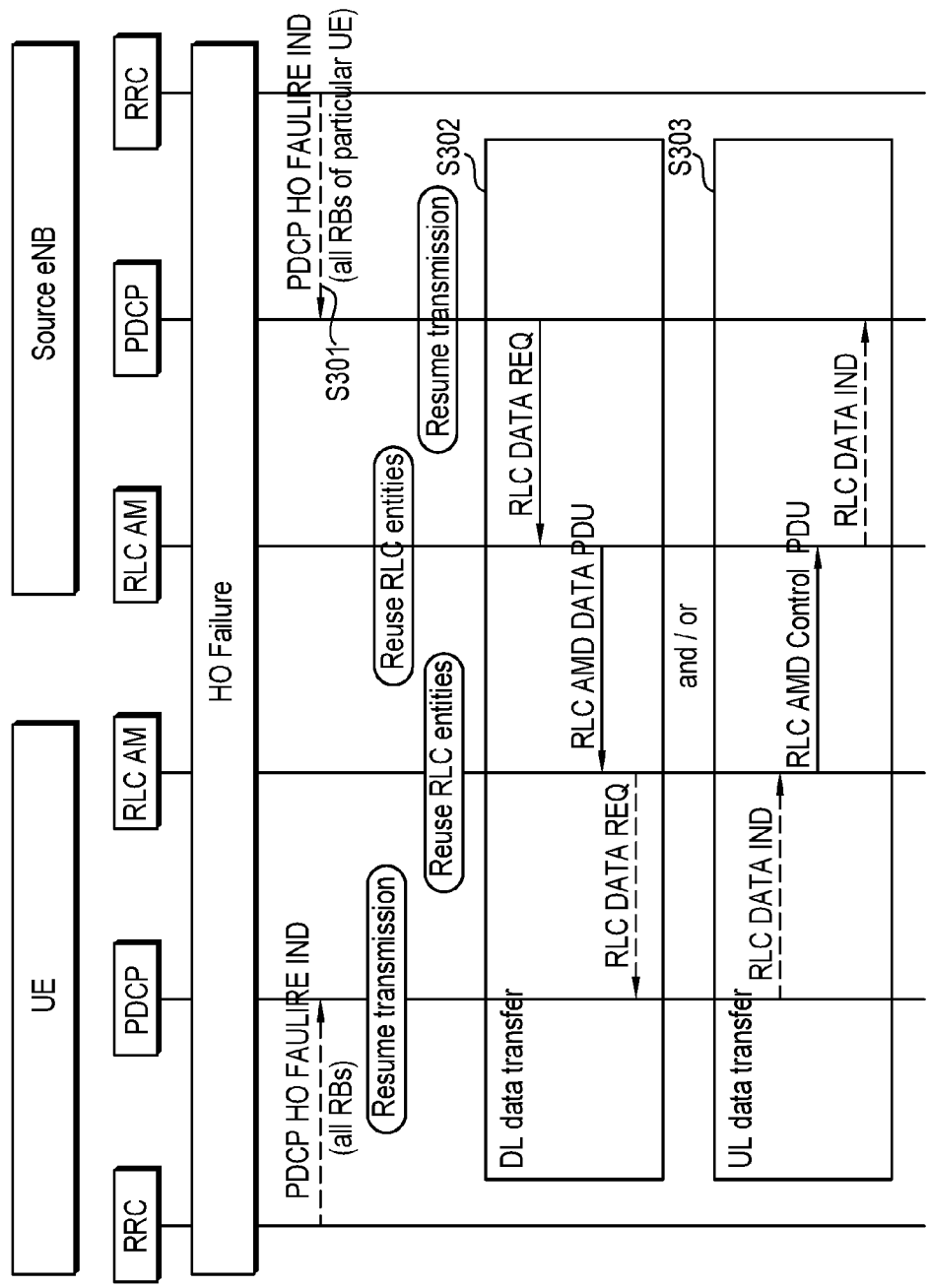
FIG. 11 is a flow chart illustrating the process of a method for re-using the RLC layer when handover fails according to an embodiment of the present invention.

FIG. 11 is a flow chart illustrating the process of a method for re-using the RLC layer when handover fails according to an embodiment of the present invention.

With reference to FIG. 11, if the handover fails, the source eNB and the UE should transmit/receive data again. With the handover failing, the RRC layer of the source eNB reports re-start of data transmission/reception to every radio bearer with respect to the UE through a primitive PDCP_HO_Failure_IND (S301). Meanwhile, the RLC layers have been reset, not released, and synchronization is matched at the both ends, so the RLC layers can immediately perform downlink data transmission/reception by re-using existing RLC entities without a primitive (S302, S303).

The following paragraphs describe the method for operating the RLC layer which is reported on the handover execution.

Figure 12:
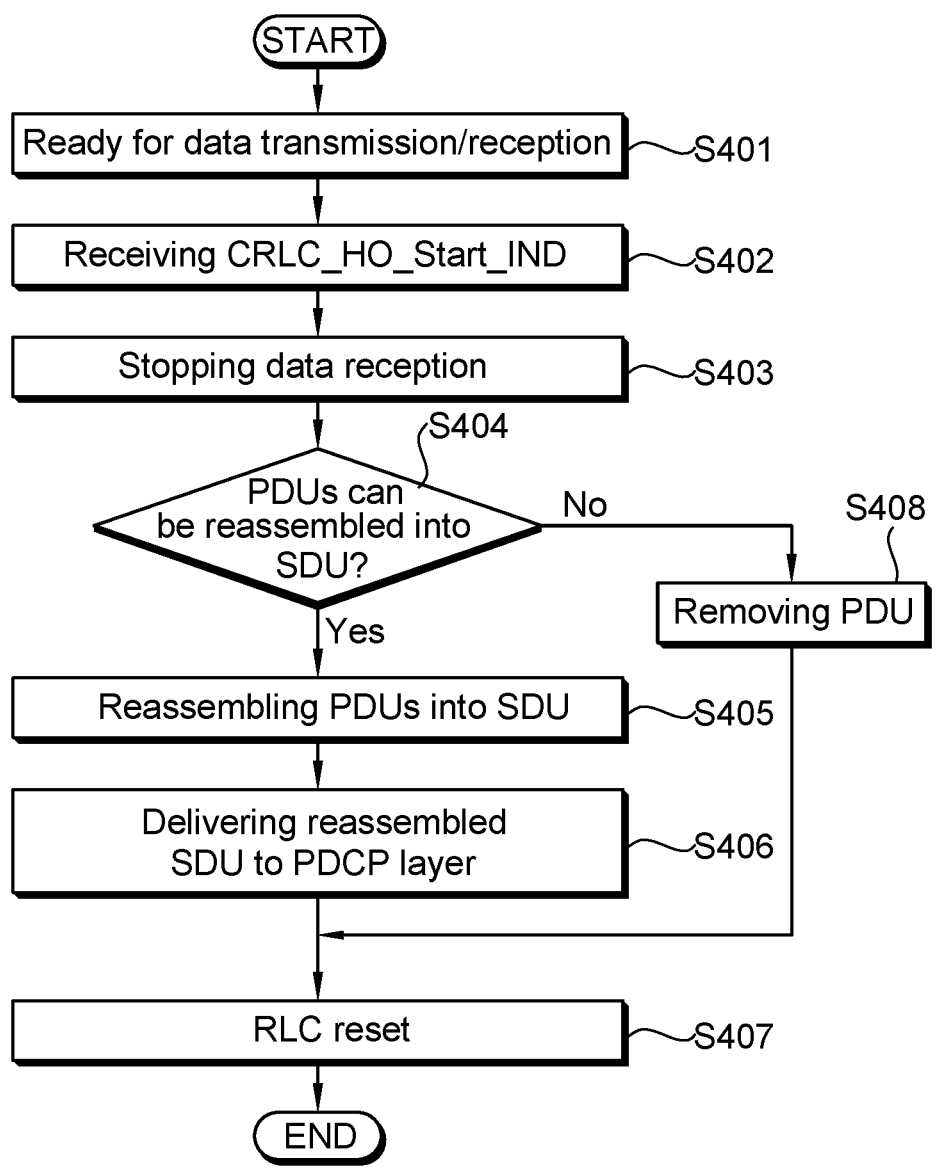
FIG. 12 is a flow chart illustrating the process of a method for operating the RLC layer which has been reported on handover execution according to an embodiment of the present invention.

FIG. 12 is a flow chart illustrating the process of the method for operating the RLC layer which is reported on the handover execution according to an embodiment of the present invention. Specifically, FIG. 12 shows an out-of-sequence SDU delivery operation of the RLC layer of a reception end, among operations of the RLC layer. Here, RLC layer of the reception end refers to an RLC layer of a UE or an eNB that receive data. Namely, RLC layer of the reception end may be the RLC layer of the source eNB in the uplink data transmission or the RLC layer of the UE in the downlink data transmission.

With reference to FIG. 12, the process begins when the RLC layer is ready to transmit/receive data (DATA_TRANSFER_READY) (S401). The RLC layer receives a primitive CRLC_HO_START_IND from the RRC layer (S402). At this time, the RLC layer stops receiving of data (S403). The RLC layer decodes segmentation header information such as sequence information SI, sequence order SO, length information LI, or the like, to check whether PDUs, at least one data block, can be assembled regardless of the reception order to create reassembled data blocks, namely SDUs (S404).

If the PDUs can be reassembled into SDUs, RLC layer reassembles the PDUs into SDUs (S405) and delivers the reassembled at least one SDU to the PDCP layer (S406). At this time, the RLC layer is reset by initializing state variables and the timer except configurable parameters (S407).

If the PDUs are determined not to be reassembled into SDUs, the RLC layer removes the PDUs that cannot be reassembled (S408) and is re-set (S407). Thereafter, in case of handover failure, the RLC layer is ready for data transmission/reception (DATA_TRANSFER_READY) to transmit/receive data again. Here, in the resetting, a reset PDU is not transmitted to a counterpart RLC layer, it is not necessary to transition to a reset pending state. That is, because the RLC layers of the UE and the source eNB are all reset according to the handover command, there is no need to match synchronization between the RLC layers of the both ends. In resetting, the RLC layer of the reception end as well as that of the transmission end is reset.

The following paragraphs describe the method for performing out-of-sequence SDU delivery by the RLC upon receiving a report on the handover execution.

Figure 13:
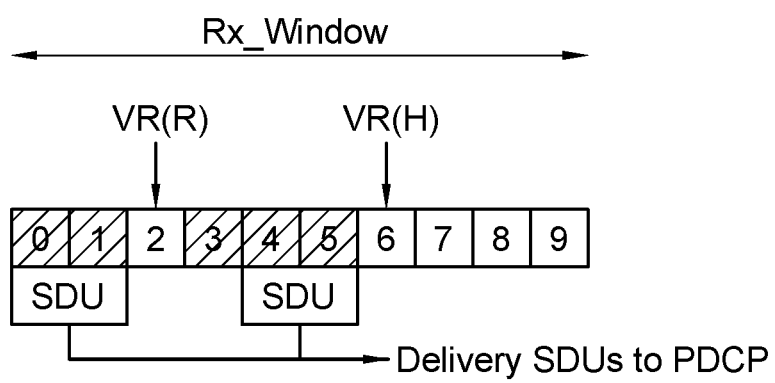
FIG. 13 is a view showing a method for creating and delivering SDUs out of sequence according to one embodiment of the present invention.

FIG. 13 describes the method for performing out-of-sequence SDUs delivery according to one embodiment of the present invention. Specifically, FIG. 13 shows the case where re-transmission of data within the reception buffer of the RLC layer and reassembling of data blocks are processed by using the reception window (Rx_Window).

With reference to FIG. 13, the PDUs, data blocks, corresponding to sequential numbers 0, 1, 3, 4, and 5 are stored, and the size of the reception window (Rx_Window) is 10. The reception buffer corresponds to a reception buffer of the RLC layer after the primitive CRLC_HO_START_IND is received from the RRC layer. The reception buffer may be that of the RLC layer of the UE or that of the RLC layer of the eNB. VR(R) and VR(H) are state variables, and the reception window is a configurable parameter. In the reception buffer, the RLC entity may reorder the PDUs, data blocks, by the size of the reception window and reassemble them into at least one SDU, a combination of data blocks.

The VR(R) indicates a sequence number (SN) which the RLC entity expects to receive in sequence, and the VR(H) indicates an SN which is 1 larger than the largest one of SNs. The PDUs corresponding to SNs 0 and 1 form an SDU, one reassembled data block, and the PDUs corresponding to SNs 4 and 5 form an SDU, another reassembled data block. The two reassembled data blocks, SDUs, are delivered from the RLC layer to the PDCP layer. Hereinafter, the reassembled data blocks created by assembling one or more data blocks within the reception window regardless of the order of the SNs of the data blocks are called reassembled SDUs and the data blocks are called PDUs.

After receiving the CRLC_HO_START_IND, if the PDUs of the SNs 0, 1, 3, 4, and 5 have been stored in the reception buffer, the RLC layer stops receiving of data, decodes segmentation headers to reassemble all the PDUs that can be reassembled into SDUs, and delivers the reassembled SDUs to the PDCP layer.

The RLC layer may transmit the two reassembled SDUs to the PDCP layer, separately, or may transmit all the SDUs to the PDCP layer collectively at a time. When the SDUs are transmitted separately, information about the last SDU that is finally transmitted among the SDUs, should be provided to the PDCP layer. When the SDUs are transmitted collectively, there is no need to inform the PDCP layer about the last SDU, so the transmission efficiency can be improved.

Figure 14:
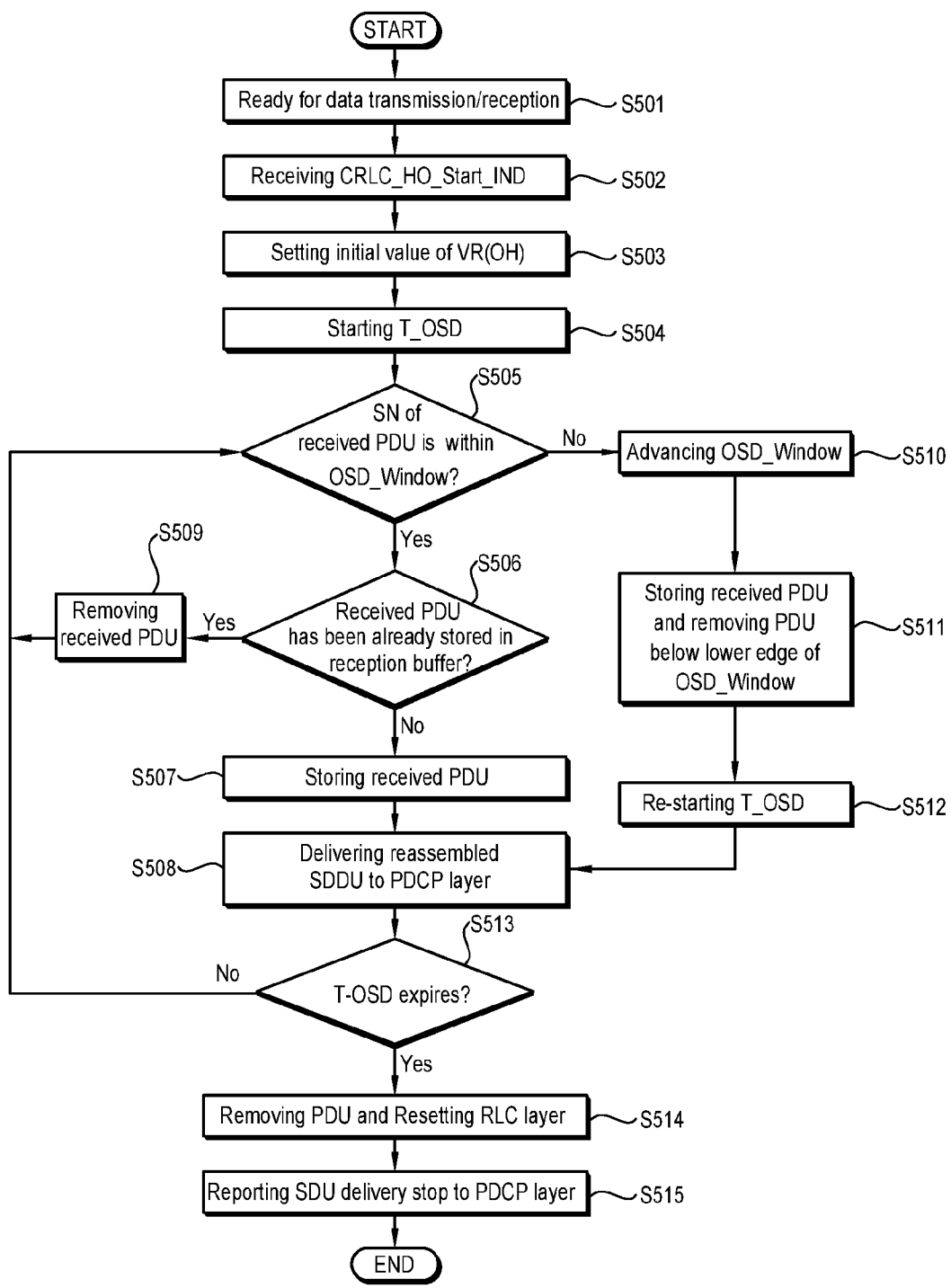
FIG. 14 is a flow chart illustrating a method for creating and delivering SDUs out of sequence according to another embodiment of the present invention.

FIG. 14 is a flow chart illustrating a method for creating and delivering SDUs out of sequence according to another embodiment of the present invention. The out-of-sequence SDU creating and delivering method can be applicable for the RLC layer of the reception end (i.e., the RLC layer of the UE or that of the base station). Specifically, FIG. 14 shows the case where re-transmission of data and reassembling of data blocks in the reception buffer of the RLC layer are processed by using the OSD_Window.

With reference to FIG. 14, the RLC layer prepares for data transmission/reception (DATA_TRANSFER_READY) (S501). The RLC layer receives a primitive CRLC_HO_START_IND from the RRC layer (S502). The RLC layer sets an initial value of VR(OH) from the VR(H), a state variable (S503). The VR(0H) is equal to VR(H)−1. For example, if VR(H) is 8, the VR(OH) becomes 7. An operation of the OSD_Window (Out-of-Sequence Delivery Window) starts to perform out-of-sequence SDU delivery from the VR(OH).

The RLC layer starts a T_OSD (Timer_Out-of-Sequence Delivery), a timer informing about termination of the out-of-sequence SDUs (S504). The RLC layer receives PDU, and checks whether the SN of the received PDU is within the OSD_Window (S505). If the SN of the received PDU is within the OSD_Window, the RLC layer checks whether the received PDU has been already stored in the reception buffer (S506).

If the received PDU is not stored in the reception buffer, the RLC layer stores the received PDU in the reception buffer (S507), creates an SDU that can be reassembled regardless of the order of the received PDU, and delivers the SDU to the PDCP layer (S508). If the received PDU has been already stored in the reception buffer, the RLC layer removes the received PDU (S509).

If the SN of the received PDU is not in the OSD_Window (in other words, if the SN of the received PDU is larger than VR(OH)), the RLC layer advances the OSD_Window such that the VR(OH) becomes the SN of the received PDU (S510). The RLC layer stores the received PDU in the reception buffer, and removes PDUs below a lower edge of the OSD_Window (S511). The RLC layer re-starts the T_OSD (S512). Here, the reason for re-starting the T_OSD is to receive the PDUs within the OSD_Window and deliver the SDUs out of sequence until the timer expires. Thus, when the OSD_Window advances, it should wait for the T_OSD according to the new OSD_Window.

After re-starting the T_OSD, the RLC layer delivers the SDUs that can be reassembled to the PDCP layer (S508). The RLC layer checks whether the re-started T_OSD has expired (S513). If the re-started T_OSD has not expired, the RLC layer continuously receives PDUs and checks whether SNs of the received PDUs are within the OSD_Window (S505).

If the re-started T_OSD has expired, the PDUs stored in the reception buffer are removed and the RLC layer is re-set (S514). Here, in resetting the RLC layer, a reset PDU is not transmitted to the counterpart RLC layer, so it does not need to transition to a reset pending state. When the resetting is performed, the entire RLC layers, including the RLC layer of the transmission end as well as the RLC layer of the reception end, are re-set. At this time, the RLC layer delivers an SDU transmission stop message indicating that no more SDU will be delivered to the PDCP layer to the PDCP layer (S515).

Because of the out-of-sequence SDU delivery, the delivery of the data can be guaranteed without a loss with respect to the SDUs which have been received and reassembled at the RLC layer. In addition, because the reassembled SDUs are delivered at a time, signaling for informing the PDCP layer that the out-of-sequence delivery has been completed is not necessary, and thus, the process gain can be obtained.

Figure 15:
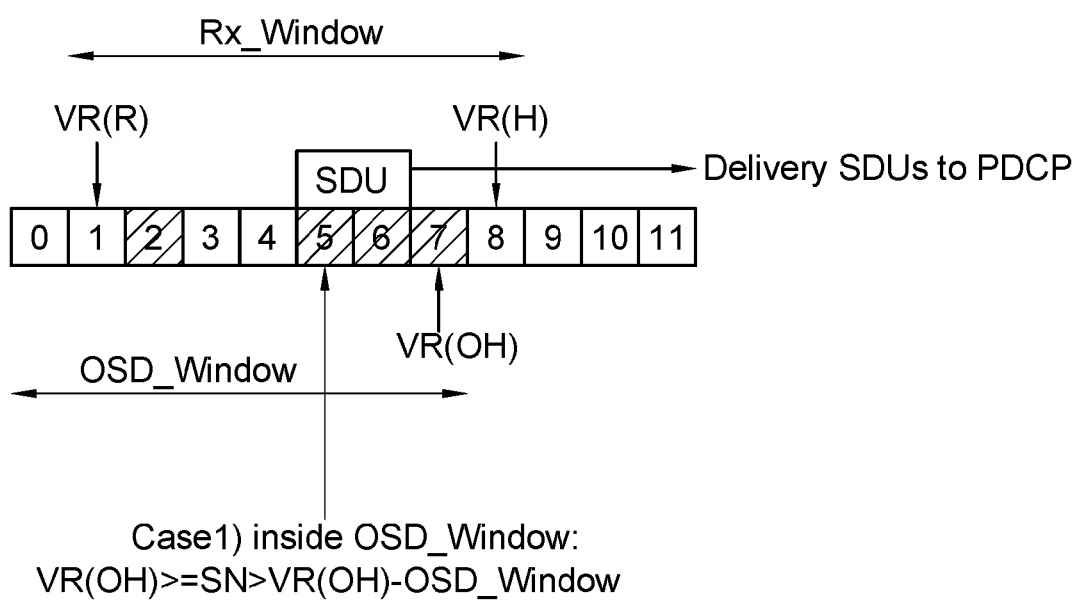
FIG. 15 is a view showing a method for creating and delivering SDUs out of sequence in FIG. 14 according to one embodiment of the present invention.

FIG. 15 is a view showing a method for creating and delivering SDUs out of sequence in FIG. 14 according to one embodiment of the present invention. Here, it is assumed that the SNs of PDUs stored in the reception buffer before the RLC layer receives CRLC_HO_START_IND are 2, 6, and 7.

With reference to FIG. 15, the PDUs, data blocks corresponding to the SNs 2, 6, and 7, are stored in the reception buffer, and the size of the reception window (Rx_Window) is 8 (SN=1~8). Here, the state of the reception is that of after receiving the primitive CRLC_HO_START_IND, a message indicating creation of out-of-sequence SDUs from the RRC layer. The reception buffer may be the reception buffer of the RLC layer of the UE or the reception buffer of the RLC layer of the base station. The VR(R) and the VR(H) are state variables, and the reception window is a configurable parameter. The VR(R) is a lower edge of the reception window, and the VR(H) is an upper edge of the reception window. The size of the OSD_Window, the configurable parameter, is the same as or smaller than the reception window. This is to avoid laying a burden on the buffer of the reception end RLC layer.

The VR(OH), the state variable, is a value required for OSD_Window operation. When the RLC layer receives the CRLC_HO_START_IND, it sets an initial value of the VR(OH) by using the VR(H) value. For example, the initial value of the VR(OH) may be set such that VR(OH)=VR(H)−1.

For another example, the initial value of the VR(OH) may be set to indicate the largest one of the SNs of the PDUs received after the RLC layer receives the CRLC_HO_START_IND. The reception buffer stores PDUs of the SNs 2, 6, and 7. In case 1, if the RLC layer receives a PDU of the SN 5 after receiving the CRLC_HO_START_IND, the VR(OH) indicates the largest SN among the SNs of the received PDUs is SN 7. The RLC layer starts OSD_Window based on the set VR(OH).

The SN of the PDU received after the RLC layer receives CRLC_HO_START_IND is 5 and it is within the OSD_Window (namely, VR(OH)≥5(SN)>VR−(Size of OSD_Window)). Thus, the RLC layer stores the PDU of the SN 5 in the reception buffer, decodes segmentation header information (e.g., SI, SO, LI, etc.), and reassembles at least one PDU regardless of the SN to create an SDU. The RLC layer delivers the SDU to the PDCP layer. Here, an SDU is delivered to the PDCP layer whenever PDUs are reassembled.

Figure 16:
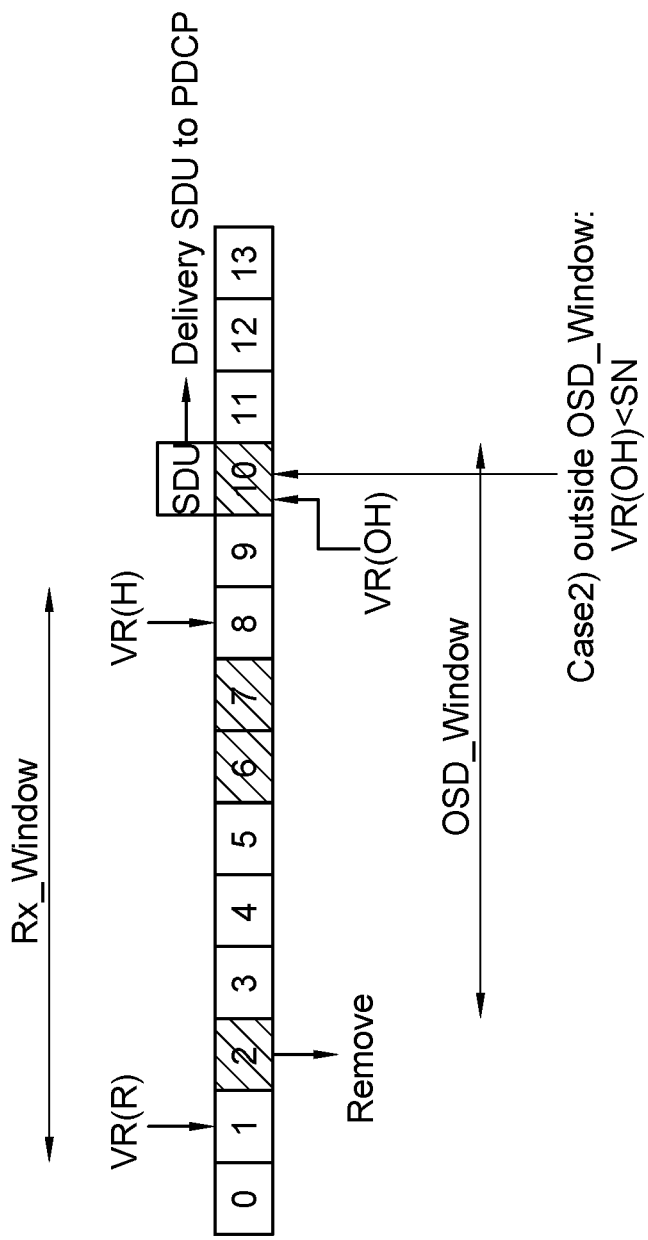
FIG. 16 is a view showing a method for creating and delivering SDUs out of sequence in FIG. 14 according to another embodiment of the present invention.

FIG. 16 is a view showing a method for creating and delivering SDUs out of sequence in FIG. 14 according to another embodiment of the present invention. It is assumed that the SNs of PDUs stored in the reception buffer before the RLC layer receives the CRLC_HO_START_IND are 2, 6, and 7. The case shown in FIG. 14 is different from the case shown in FIG. 13 in that the SN of a PDU received after the RLC layer receives the CRLC_HO_ START_IND is 10 and it is not within the reception window, while, in the latter case (FIG. 13), the SN of the PDU received after the RLC layer receives the CRLC_HO_START_IND is within the reception window.

With reference to FIG. 16, the SN of the PDU received after the RLC layer receives the CRLC_HO_START_IND indicating creating of an out-of-sequence SDU from the RRC layer is 10, and it is larger than the upper edge of the OSD_Window. Thus, the RLC layer resets the VR(OH) from 7 to 10, and advances the OSD_Window accordingly. If the PDU of the SN 10 can be reassembled to create an SDU, an SDU is created and then delivered to the PDCP layer. Meanwhile, as the PDU of the SN 2 is positioned outside the lower edge of the OSD_Window due to the advancement of the OSD_Window is determined not to be reassembled into an SDU, it is removed from the reception buffer.

As described above, in the handover execution, because the RLC layer delivers all the possible SDUs to the PDCP layer, re-transmission for recovering data lost between the UE and the target eNB after handover completion can be reduced. Namely, because the amount of control signals and re-transmission data transmitted to the radio channel to recover data of the PDCP layer is reduced, the overhead of radio resources can be reduced, the recovery time with respect to the lost data can be shortened, and the final throughput can be improved.

In addition, in a state that data transmission/reception is available after the RLC layer is reset, if handover is completed, the RLC layer can be released, and even if handover fails, an internal signaling indicating a start of data transmission/reception between the UE and the source eNB is not necessary. Also, because a control signal in a radio channel for matching synchronization between RLC layers of the both ends is not necessary, a transmission delay can be reduced and a processing gain can be obtained.

In the previously described embodiments, by not flushing buffers during handover as done in the prior art, and by sending out-of-sequence SDUs, the RLC layers of the UE and eNB that were established prior to handover are re-established after handover, rather than completely recreated.

Thus, in the present invention, for both a UM and an AM RLC entity, where possible, RLC SDUs are reassembled from lower layer PDUs and delivered to an upper layer (e.g., to the PDCP layer) in a sequence. This reassembly may include restricting the reassembly to PDUs with a serial number less than a threshold value and may include removing corresponding RLC headers.

The foregoing description of the preferred embodiments of the present invention has been presented for the purpose of illustration and description. It is not intended to be exhaustive or to limit the invention to the precise form disclosed, and modifications and variations are possible in light of the above teachings or may be acquired from practice of the invention. It is intended that the scope of the invention be defined by the claims appended hereto and their equivalents.

What is claimed is:

1. A method of performing handover by a mobile terminal from a source base station to a target base station, the mobile terminal having a Radio Resource Control (RRC) layer and a Radio Link Control (RLC) layer, the method comprising:
receiving, at the RRC layer of the mobile terminal, a handover command;
receiving, at the RLC layer of the mobile terminal, an indication associated with the handover command;
reassembling, at the RLC layer of the mobile terminal, at least one RLC service data unit (SDU) from at least one protocol data unit (PDU) having a sequence number that is less than a higher edge of a window of the mobile terminal, wherein the higher edge of the window of the mobile terminal corresponds to a sequence number following a highest sequence number among at least one PDU received out of sequence by the RLC layer of the mobile terminal;
delivering, at the RLC layer of the mobile terminal, the reassembled at least one RLC SDU to an upper layer of the mobile terminal;

discarding, at the RLC layer of the mobile terminal, at least one remaining PDU that could not be reassembled into at least one RLC SDU; and initializing a state variable associated with the window of the mobile terminal.

2. The method of claim 1, further comprising:

checking header information of the at least one PDU having the sequence number.

3. The method of claim 1, wherein the indication is a handover primitive which indicates a start of the handover.

4. The method of claim 1, further comprising:

after receiving the indication, stopping, at the RLC layer of the mobile terminal, a data receipt.

5. The method of claim 1, further comprising:

after receiving the indication, stopping, at the RLC layer of the mobile terminal, a data receipt; and reordering, at the upper layer of the mobile terminal, the reassembled at least one RLC SDU, wherein the upper layer of the mobile terminal is a Packet Data Convergence Protocol (PDCP) layer.

6. A mobile terminal having a Radio Resource Control (RRC) layer and a Radio Link Control (RLC) layer, the mobile terminal comprising:

a radio frequency (RF) unit configured to receive and transmit a signal; and a processor coupled to the RF unit and configured to:
  receive, at the RRC layer of the mobile terminal, a handover command;
  receive, at the RLC layer of the mobile terminal, an indication associated with the handover command;
  reassemble, at the RLC layer of the mobile terminal, at least one RLC service data unit (SDU) from at least one protocol data unit (PDU) having a sequence number that is less than a higher edge of a window of the mobile terminal, wherein the higher edge of the window of the mobile terminal corresponds to a sequence number following a highest sequence number among at least one PDU received out of sequence by the RLC layer of the mobile terminal;
  deliver, at the RLC layer of the mobile terminal, the reassembled at least one RLC SDU to an upper layer of the mobile terminal;
  discard, at the RLC layer of the mobile terminal, at least one remaining PDU that could not be reassembled into at least one RLC SDU; and
  initialize a state variable associated with the window of the mobile terminal.

7. The mobile terminal of claim 6, wherein the processor is further configured to check header information of the at least one PDU having the sequence number.

8. The mobile terminal of claim 6, wherein the indication is a handover primitive which indicates a start of the handover.

9. The mobile terminal of claim 6, wherein the processor is further configured to stop, at the RLC layer of the mobile terminal, a data receipt after receiving the indication.

10. The mobile terminal of claim 6, wherein the processor is further configured to:

after receiving the indication, stop, at the RLC layer of the mobile terminal, a data receipt; and reorder, at the upper layer of the mobile terminal, the reassembled at least one RLC SDU, wherein the upper layer of the mobile terminal is a Packet Data Convergence Protocol (PDCP) layer.

* * * * *